(12) United States Patent
Giroux

(10) Patent No.: US 11,472,446 B2
(45) Date of Patent: Oct. 18, 2022

(54) RAIL VEHICLE HAVING A PASSENGER AREA EQUIPPED WITH A PERCH SEAT AND TABLE ASSEMBLY

(71) Applicant: Bombardier Transportation GmbH, Berlin (DE)

(72) Inventor: Alexandre Giroux, Saint-Hubert (CA)

(73) Assignee: Bombardier Transportation GmbH, Berlin (DE)

( * ) Notice: Subject to any disclaimer, the term of this patent is extended or adjusted under 35 U.S.C. 154(b) by 147 days.

(21) Appl. No.: 17/124,624

(22) Filed: Dec. 17, 2020

(65) Prior Publication Data

US 2021/0188329 A1 Jun. 24, 2021

(30) Foreign Application Priority Data

Dec. 19, 2019 (EP) .................................... 19020716

(51) Int. Cl.
| | |
|---|---|
| *B61D 1/04* | (2006.01) |
| *B61D 33/00* | (2006.01) |
| *B61D 37/00* | (2006.01) |
| *B60N 3/00* | (2006.01) |
| *B60N 2/24* | (2006.01) |

(52) U.S. Cl.
CPC ............. *B61D 1/04* (2013.01); *B60N 3/001* (2013.01); *B61D 33/0064* (2013.01); *B61D 37/00* (2013.01); *B60N 2002/247* (2013.01)

(58) Field of Classification Search
CPC ...... B61D 33/0064; B61D 1/04; B61D 33/00; B61D 37/00; B60N 2002/247; B60N 3/001; B60N 2/24; B60N 2/015
USPC ........................................................ 297/217.7
See application file for complete search history.

(56) References Cited

U.S. PATENT DOCUMENTS

| | | | | |
|---|---|---|---|---|
| 5,435,623 A | * | 7/1995 | Kapec ..................... | A47C 9/005 297/284.11 |
| 8,220,872 B2 | * | 7/2012 | Hong ...................... | A47C 9/025 297/344.17 |

FOREIGN PATENT DOCUMENTS

| | | | | |
|---|---|---|---|---|
| DE | 102017212408 B3 | * | 1/2019 | ........ B60N 2002/247 |
| EP | 0336844 A2 | * | 10/1989 | ............. B60N 2/015 |
| EP | 2851256 A1 | | 3/2015 | |
| WO | WO8701568 A1 | * | 3/1987 | ............. B60N 2/015 |
| WO | WO8701995 A | * | 4/1987 | ............. B60N 2/242 |
| WO | WO-2011029697 A1 | * | 3/2011 | ............. B60N 2/015 |

* cited by examiner

*Primary Examiner* — Milton Nelson, Jr.
(74) *Attorney, Agent, or Firm* — The Webb Law Firm

(57) ABSTRACT

A rail vehicle is provided with an open passenger space equipped with a perch seat assembly. The perch seat assembly includes a perch seat, a table, and a transition portion joining the table to the perch seat. The table has a horizontal working surface which extends from a wall so that at least a portion of the table extends in front of the perch seat. The transition surface provides a continuous surface between the perch seat surface and the table surface so as to provide a smooth transition.

12 Claims, 3 Drawing Sheets

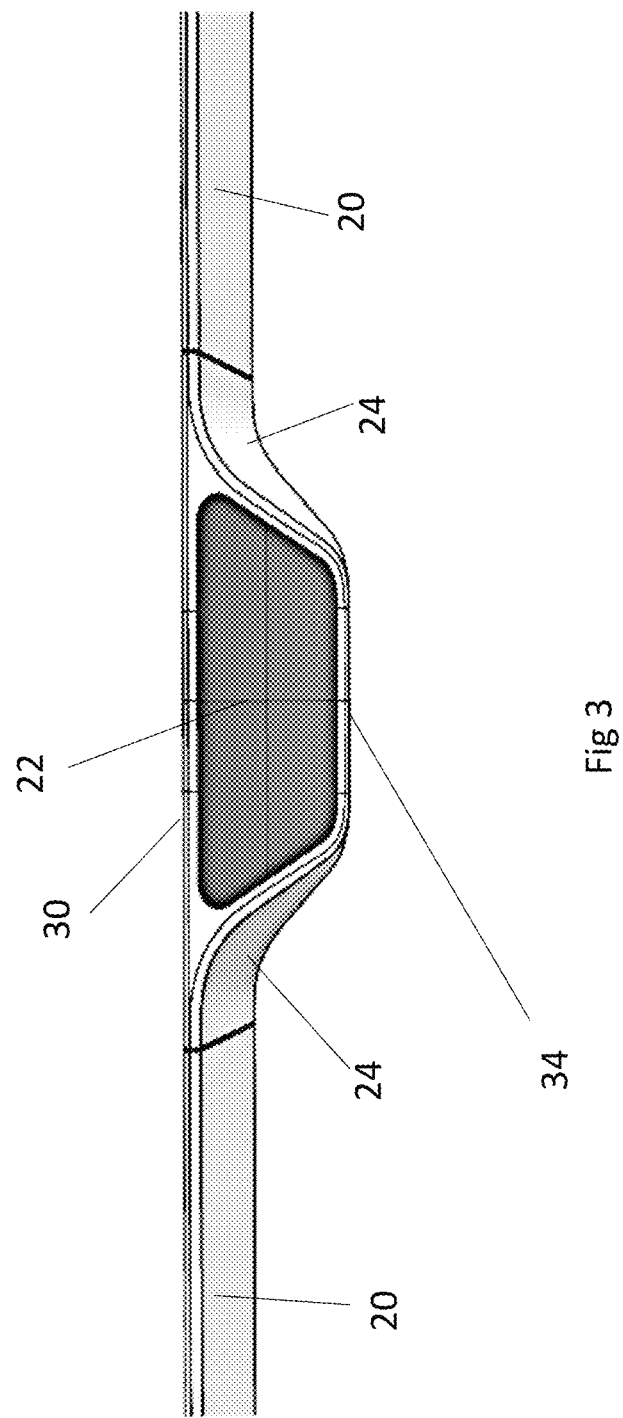

RAIL VEHICLE HAVING A PASSENGER AREA EQUIPPED WITH A PERCH SEAT AND TABLE ASSEMBLY

CROSS-REFERENCE TO RELATED APPLICATION

This application claims priority to European Patent Application No. 19020716.7 filed Dec. 19, 2019, the disclosure of which is hereby incorporated by reference in its entirety.

BACKGROUND OF THE INVENTION

Field of the Invention

The present invention generally relates to the field of interior arrangement of passenger railway vehicles. More specifically, the invention relates to a rail vehicle having an open passenger area equipped with an integrated arrangement of perch seat and table.

Description of Related Art

Perch seats are used in rail vehicles to provide additional temporary seating in a generally open space. Perch seats, typically installed along surrounding walls of the open passenger space, provide increased comfort and stability to passengers when compared to simply standing up. On rail vehicles travelling on long journeys, these open spaces are typically used as bars or rest areas which may be used by passengers to stretch legs and to engage in social conversations with fellow passengers.

European Patent no. 2851256 to Bombardier discloses a room divider for placing into the open space area of a rail vehicle and providing the convenience of perch seats. The room divider provides a small support surface for example for recharging a mobile phone. This support surface may be convenient for standing passengers, but it unfortunately cannot be easily reached by passengers seated in perch seats since the support surface is located behind them.

There is therefore a need for a passenger space in a rail vehicle which is convenient, comfortable and inviting for passengers to relax and/or engage in discussions with fellow passengers.

SUMMARY OF THE INVENTION

It is an object of the present invention to provide a passenger area of a rail vehicle equipped with a perch seat and table assembly that overcomes or mitigates one or more disadvantages of known passenger areas, or at least provides a useful alternative.

The invention provides the advantages of allowing passengers seated in perch seats to easily use a table and to conveniently engage in discussions with fellow passengers should they wish so. Moreover, a smooth transition between perch seats and a table minimizes risks for passengers of hurting themselves against the table in case of sudden acceleration or braking of the rail vehicle.

In accordance with an embodiment of the present invention, there is provided a rail vehicle comprising a passenger space having a wall, a first perch seat, a table and a first transition surface joining the table to the first perch seat. The first perch seat is installed within the passenger space along the wall. The first perch seat has a first seating surface. The table has a horizontal working surface which extends from the wall so that at least a portion, preferably a major portion, of the table extends in front of the first perch seat and of a passenger seated in the first perch seat. The first transition surface has a first seat edge coplanar with the first seating surface and a first table edge coplanar with the working surface of the table. The first transition surface provides a continuous surface between the first seat edge and the first table edge so as to provide a smooth transition between both edges, thereby creating such continuous surface from the first seating surface to the table working surface.

Optionally, the first transition surface may be tangent to the first seating surface at the first seat edge and tangent to the working surface at the first table edge.

Optionally, a back edge of the table may be substantially colinear with an upper edge of the first perch seat and a front edge of the table may be connected to a lower edge of the first perch seat by a first transition edge of the transition surface.

Preferably, the first seating surface is located predominantly below the working surface so that the table is at a convenient height for the seated passenger.

Typically, the first seating surface is installed at an angle from the wall comprised between 0 and 60 degrees. The working surface may adopt a trapezoidal shape.

Optionally, a second perch seat with a second seating surface may be provided on the opposite side of the table from the first perch seat with a second transition surface joining the table to the second perch seat. The second transition surface has a second seat edge coplanar with the second seating surface and a second table edge coplanar with the working surface. The second transition surface provides a continuous surface extending between the second seat edge and the second table edge, thereby creating such continuous surface from the second seating surface to the table working surface.

The second perch seat may be attached along the same wall and a second seating surface of the second perch seat is then coplanar with the first seating surface. Alternatively, the first perch seat may be installed on a longitudinal wall whereas the second perch seat may be installed along an inner wall.

The second transition surface may be tangent to the second seating surface at the second seat edge and tangent to the working surface at the second table edge.

Similarly to the first upper edge, the second upper edge may be substantially colinear with the back edge of the table. The front edge of the table may be connected to the second lower edge of the second perch seat by a second front transition edge of the second transition surface.

Similarly to the first seating surface, the second seating surface may be predominantly located below the working surface.

Typically, the second seating surface is also installed at an angle ranging between 0 and 60 degrees from the wall.

BRIEF DESCRIPTION OF THE DRAWINGS

These and other features of the present invention will become more apparent from the following description in which reference is made to the appended drawings wherein:

FIG. 3 is a top view of a portion of the open passenger space of FIG. 1.

DESCRIPTION OF THE INVENTION

The present invention relates to a passenger rail vehicle having an open space where passengers may stretch their legs and rest against perch seats while using conveniently placed tables.

Figure 1:
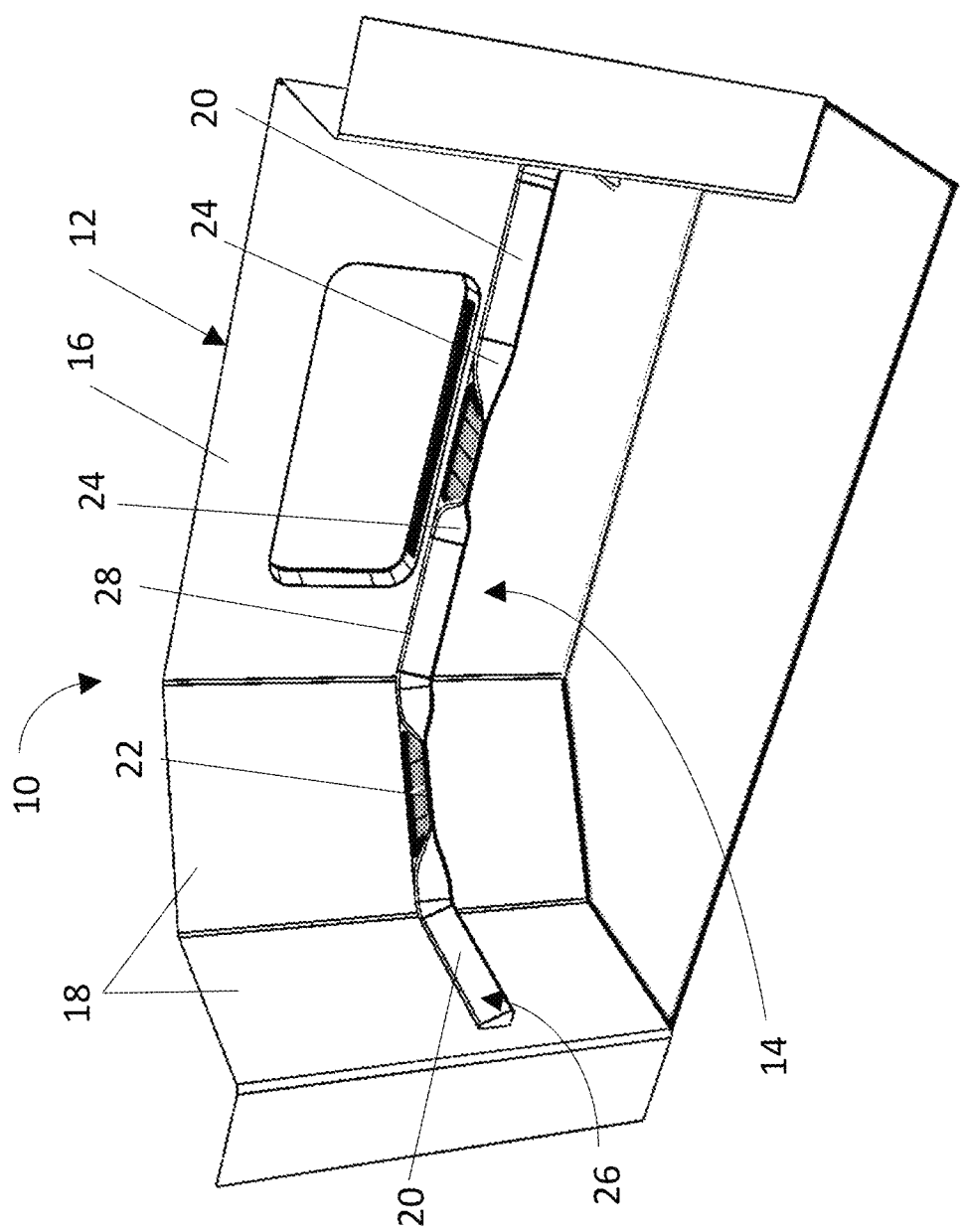
FIG. 1 is a perspective view of an open passenger space equipped with a perch seat assembly in accordance with an embodiment of the present invention.

FIG. 1 represents an open passenger space 10 inside a rail vehicle 12. Such an open passenger space 10 is often provided in long-distance trains such as high-speed trains and is typically used as an area to rest and stretch legs or as a bar area. The passenger space 10 typically stretches the whole width of the rail vehicle 12 and along a portion of it lengthwise.

To better accommodate passengers, the open passenger space 10 is provided with perch seat assembly 14 installed along at least one wall, be it a side wall 16 or an inner wall 18. The perch seat assembly 14 comprises at least one perch seat 20, at least one table 22 and at least one transition portion 24.

Each perch seat 20 provides a seating surface 26 that is typically at an angle between 0 and 60 degrees from the side wall 16, thereby providing mostly lateral, but also some vertical support to users. The perch seat 20 may be padded or not.

Figure 2:
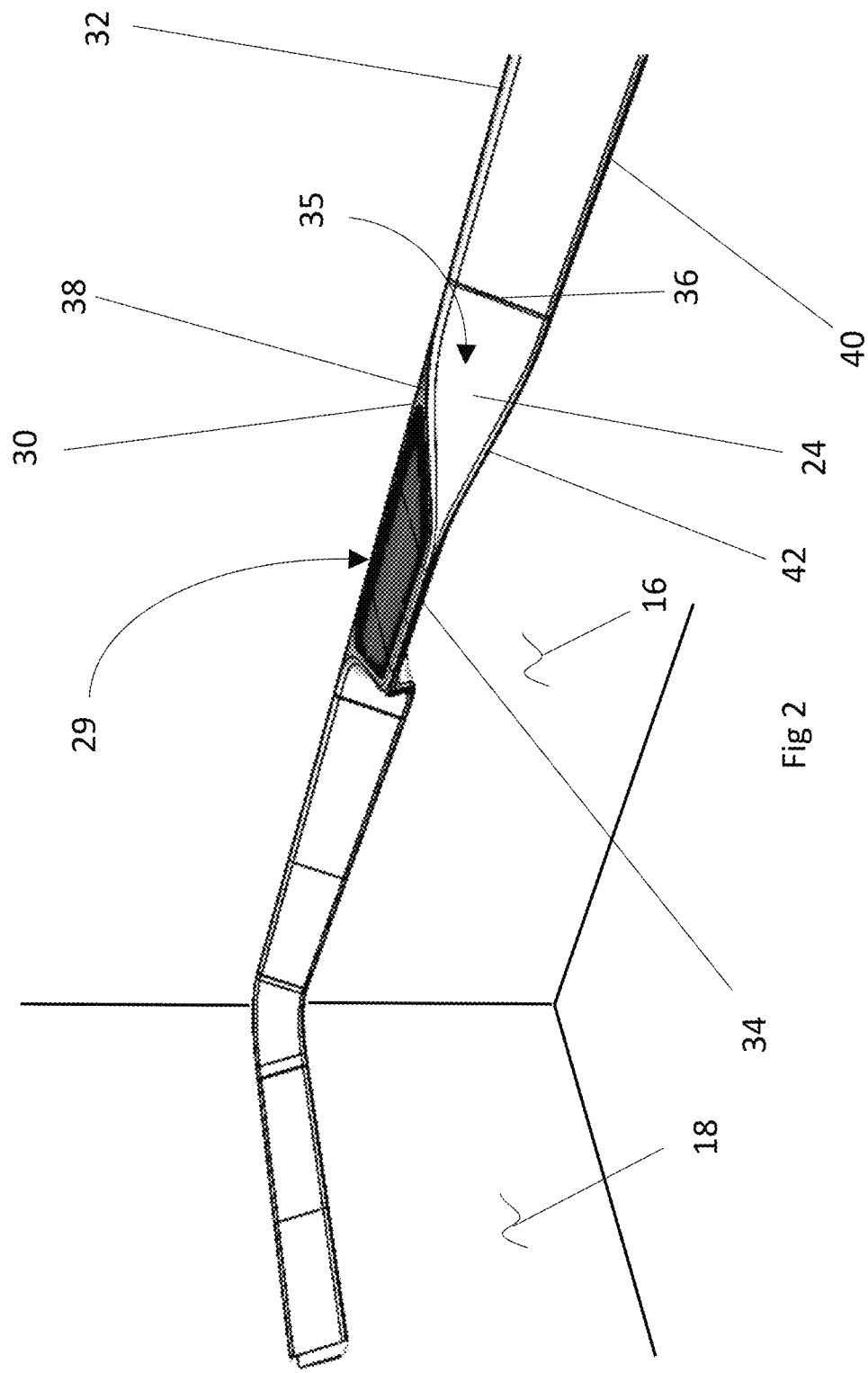
FIG. 2 is another perspective view of the open passenger space of FIG. 1.

The table 22 is attached either to the side wall 16 or the inner wall 18. The table 22 is therefore adjacent to one or two perch seats 20. The table 22 is positioned above or substantially at the same height as an upper portion 28 of the perch seat 20 and extends away from the wall to which it is attached. So installed and designed, the table 22 is conveniently placed to be used by passengers leaning against the adjacent perch seats 20 since at least a portion of its horizontal working surface 29 extends in front of the adjacent perch seats 20. The table 22 may be shorter so as to extend mostly on the side of seated passengers, or it may be deeper so as to reach further in front of passengers. A back edge 30 of the table 22 is substantially aligned, or colinear, with an upper edge 32 of the perch seat 20. This is best shown in FIG. 2, now concurrently referred to.

The table 22 may adopt a trapezoidal shape where its front edge 34 is shorter than its back edge 30. The table 22 could also have a rounded front edge 34. The trapezoidal shape of the table 22 is best shown in FIG. 3, now concurrently referred to.

Considering that the rail vehicle 12 may move at high speed and that small or even larger jerking motions may occur during travelling, transition portions 24 join the table 22 to a respective one of the adjacent perch seats 20. If there are two perch seats 20, one on each side of the table 22, then there are two transition portions 24, one between each side of the table 22 and the adjacent perch seat 20 on the corresponding side of the table 22.

The transition portion 24 is designed so as to smooth out any sharp edge the table 22 could otherwise present. With its shape, the transition portion 24 presents a transition surface 35 that deflects passenger bodies so that they do not hurt themselves against the table 22. The transition portion 24 may be padded for further absorption capacity.

To provide this smooth transition between the table 22 and one adjacent perch seat 20, the transition portion 24 has a seat edge 36 coplanar with the seating surface 26 of one adjacent perch seat 20 as well as a table edge 38 coplanar with the working surface 29 of the table 22. The transition surface 35 provides a continuous surface between the seat edge 36 and the table edge 38 so as to provide a smooth transition between both edges. The seat edge 36 and the table edge 38 may be smoothed out by a fillet joining the adjacent surfaces. The transition surface 35 may be tangent to the seating surface 26 of the adjacent perch seat 20 at the seat edge 36 and may similarly be tangent to the working surface 29 of the adjacent table 22 at the table edge 38. This in fact allows extending such continuous smooth surface from the seating surface 26 to the table working surface 29 through the transition surface 35. With the transition portion 24, the front edge 34 of the table 22 may be connected to a lower edge 40 of the perch seat 20 by a transition edge 42 of the transition portion 24.

When two perch seats 20 are located one on each side of the table 22, the table 22 is typically symmetrical and so are the transition portions 24 with one another.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

The invention claimed is:

1. A rail vehicle comprising:
 a passenger space having a wall;
 a first perch seat installed within the passenger space along the wall, the first perch seat having a first seating surface; and
 a table having a horizontal working surface extending from the wall; and
 a first transition surface joining the table to the first perch seat, the first transition surface having a first seat edge coplanar with the first seating surface and a first table edge coplanar with the working surface,
 wherein the first transition surface is continuous between the first seat edge and the first table edge.

2. The rail vehicle of claim 1, wherein the first transition surface is tangent to the first seating surface at the first seat edge and tangent to the working surface at the first table edge.

3. The rail vehicle of claim 1, wherein the first seating surface further comprises a first upper edge and a first lower edge, and wherein the table further comprises a back edge and a front edge, the back edge being substantially colinear with the upper edge and the front edge being connected to the lower edge by a first transition edge of the transition surface.

4. The rail vehicle of claim 1, wherein the first seating surface is located predominantly below the working surface.

5. The rail vehicle of claim 1, wherein the first seating surface is at an angle from the wall comprised between 0 and 60 degrees, and wherein the working surface has a trapezoidal shape.

6. The rail vehicle of claim 1, wherein the rail vehicle further comprises:
 a second perch seat installed within the passenger space, the second perch seat being located on an opposite side of the table from the first perch seat, the second perch seat having a second seating surface; and
 a second transition surface joining the table to the second perch seat, the second transition surface having a second seat edge coplanar with the second seating surface and a second table edge coplanar with the working surface, the second transition surface being continuous between the second seat edge and the second table edge.

7. The rail vehicle of claim 6, wherein the second transition surface is tangent to the second seating surface at the second seat edge and tangent to the working surface at the second table edge.

8. The rail vehicle of claim 6, wherein the second seating surface further comprises a second upper edge and a second lower edge, the back edge being substantially colinear with the second upper edge and the front edge being connected to the second lower edge by a second transition edge of the second transition surface.

9. The rail vehicle of claim 6, wherein the second seating surface is located predominantly below the working surface.

10. The rail vehicle of claim 6, wherein the second seating surface is at an angle from the wall comprised between 0 and 60 degrees and wherein the working surface has a trapezoidal shape.

11. The rail vehicle of claim 6, wherein the second seating surface is coplanar with the first seating surface and is attached to the same wall.

12. The rail vehicle of claim 6, wherein the first perch seat is installed on a longitudinal wall and wherein the second perch seat is installed along an inner wall.

\* \* \* \* \*